United States Patent

[11] 3,620,329

[72] Inventor Karl Wenzlaff
Sherman Oaks, Calif.
[21] Appl. No. 889,593
[22] Filed Dec. 31, 1969
[45] Patented Nov. 16, 1971
[73] Assignee Glasrock Products, Inc.
Atlanta, Ga.

[54] JET ENGINE NOISE SUPPRESSOR
4 Claims, 3 Drawing Figs.
[52] U.S. Cl. ...................................................... 181/33 HB,
181/50, 181/59
[51] Int. Cl. ......................................................... B64d 33/06,
F01n 1/24
[50] Field of Search ........................................... 181/33, 62,
33.11, 33.04, 33.7, 48, 59, 68, 69, 71, 33.22, 42,
50, 33.221, 33.222; 239/127.1, 265.11, 265.13,
265.15

[56] References Cited
UNITED STATES PATENTS
2,297,269 9/1942 Wendt et al. .................. 181/59 UX
2,773,553 12/1956 Heurich et al. ................ 181/42
2,914,132 11/1959 Bourne et al. ................. 181/42
2,987,136 6/1961 Lilley et al. .................... 181/69 X
3,075,609 1/1963 Potter ............................. 181/62 UX
3,182,469 5/1965 Kirchner ....................... 239/265.15 UX
3,227,241 1/1966 Mattoon ........................ 181/62 X
3,353,359 11/1967 Webb ............................. 239/127.3 X
3,441,381 4/1969 Keith et al. .................... 181/62 X
3,495,950 2/1970 Barber et al. .................. 181/71 X
1,909,511 5/1933 Wilson .......................... 181/71 UX
3,153,320 10/1964 Prosser .......................... 239/127.3
3,508,838 4/1970 Martenson .................... 181/33 X FOREIGN PATENTS
733,329 6/1955 Great Britain ................ 181/48

Primary Examiner—Robert S. Ward, Jr.
Attorney—Lindenberg, Freilich and Wasserman ABSTRACT: A jet engine noise suppressor for use during ground run up of a jet engine comprising a tube having thick inner walls of a highly porous open cell ceramic material such as porous fused silica. The tube is constructed of numerous blocks of the ceramic material arranged in a circle to form a substantially circular passageway, alternate blocks extending further into the passageway to form recesses in the tube that create sound-dissipating eddys.

PATENTED NOV 16 1971
3,620,329
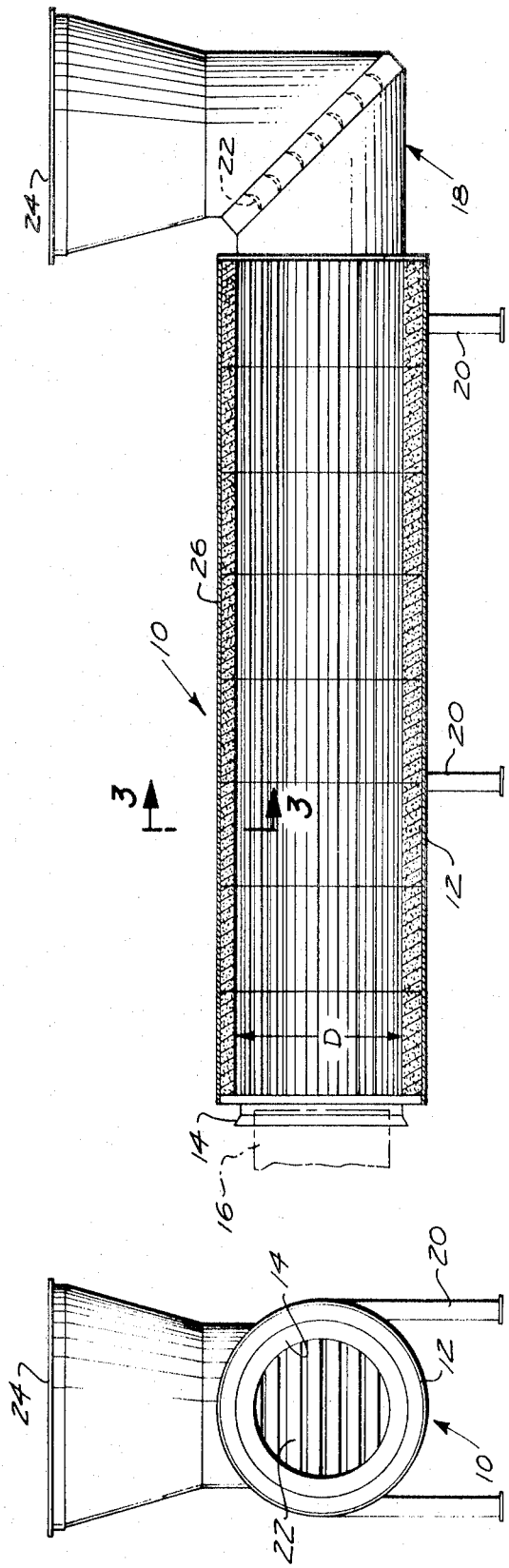
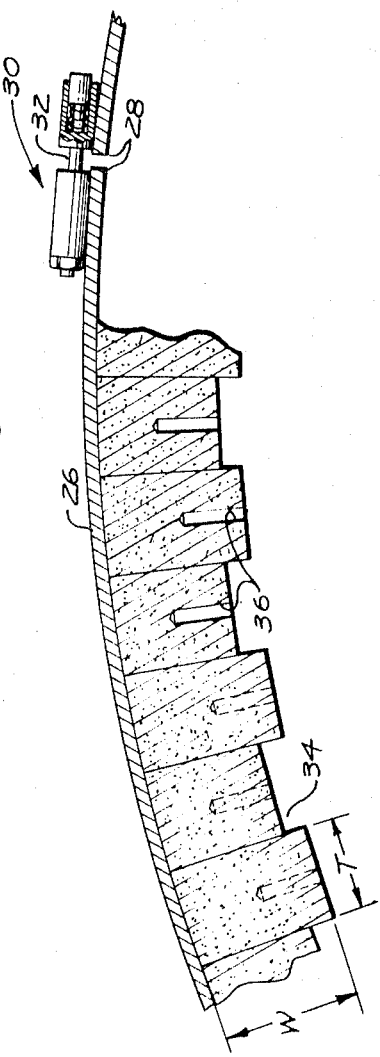
INVENTOR.
KARL WENZLAFF
BY
Lindenberg & Freilich

JET ENGINE NOISE SUPPRESSOR

BACKGROUND OF THE INVENTION

1. Field of the Invention

This invention relates to noise suppressors.

2. Description of the Prior Art

Jet engines, particularly those used on high performance military aircraft, are often run on the ground to enable testing and adjustment for peak performance. The engines create extremely high noise levels which can cause injury to personnel working on the aircraft or disturb persons living near the test area. Noise suppressors are often used which include a tube for receiving the jet engine exhaust to dissipate the sound. The tubes are designed to operate without restricting the flow of gases from the engine so as not to interfere with simulation of flight conditions.

Generally wet-type noise suppressors have been used wherein a large multiwall tube of stainless steel directly receives the exhaust gases from the engine. The inner tube has many perforations, and water is sprayed into the exhaust gases to cool the walls of the tube so they can withstand the high gas temperatures. The wet-type suppressors are expensive, because of the complexity of the water pipes. In addition, they require considerable amounts of water, such as 800 gallons per minute during a typical test period of about 5 minutes. In many locations, water is not readily available, resulting in high operating cost and great inconvenience.

A dry-type noise suppressor could result in cost savings by reduced complexity and the elimination of the need for a large water supply. Stainless steel and other available metals generally could not be used in such a suppressor because they cannot withstand the high temperatures without extensive cooling. Various ceramic materials, such as fire brick, can withstand the great heat generated by the engine exhaust. However, they do not have the acoustical properties needed to greatly suppress the sound level before the jet exhaust exits at the back of the tube.

OBJECTS AND SUMMARY OF THE INVENTION

An object of the present invention is to provide a jet engine noise suppressor for use in running jet engines on the ground, which is economical in initial cost and in operation.

Another object is to provide a dry-type jet engine noise suppressor of maximum noise suppressing capabilities.

In accordance with the present invention, apparatus is provided for suppressing the noise from a high energy gas stream such as that which issues from a jet engine. The apparatus comprises a tube having thick inner walls or linings of highly porous open cell ceramic material such as porous fused silica. It is found that thick walls of a porous ceramic material with open cell construction greatly suppresses the jet engine noise, to a level comparable to that of wet-type noise suppressors. The ceramic material can withstand the high jet exhaust temperatures so that it has a long lifetime of use, yet it operates without water or other coolant, and its simplicity allows construction at relatively low cost.

The novel features of the invention are set forth with particularity in the appended claims. The invention will be best understood from the following description when read in conjunction with the accompanying drawings.

BRIEF DESCRIPTION OF THE DRAWINGS

FIG. 1 is a sectional side elevation view of a jet engine noise suppressor constructed in accordance with the invention;

FIG. 2 is an end view of the jet engine noise suppressor of FIG. 1; and

FIG. 3 is a sectional view taken on the line 3—3 of FIG. 1.

DESCRIPTION OF THE PREFERRED EMBODIMENTS

As shown in FIG. 1, the noise suppressor 10 comprises a tube portion 12 having an inlet 14 at its front end which is adapted to receive the back portion of a jet engine indicated at 16. The rear of the tube portion is coupled to a deflector nozzle portion 18. A set of legs 20 support the apparatus on the ground. When the jet engine 16 is operating, the exhaust passes through the tube portion 12 where much of the noise is suppressed. The jet stream then passes into the nozzle portion 18, where it is deflected upward by a set of vanes 22 and exits through an end 24 of the apparatus into the ambient atmosphere.

The tube portion 12 is constructed of numerous thick blocks of a ceramic material of a highly porous open cell construction. A casing 26 of steel or the like holds the blocks tightly together. As shown in FIG. 3, the casing 26 extends almost completely around the tube, but has separated ends 28 that are held together by several clamps 30 spaced along the length of the tube. Each clamp 30 includes a threaded rod or bolt 32 extending between the casing ends, which is spring biased to urge the ends together. The blocks also may be held together by a bonding agent situated between the blocks and situated between the outer surfaces of the blocks and the inner walls of the casing 26. A ceramic material is provided for the inner walls to withstand the high temperature, such as 2,000° F. which exists at the inner walls of the tube portion in the absence of cooling. A highly porous open cell form of the ceramic material is employed to obtain the acoustical properties necessary to suppress the sound in the exhaust.

Tests have been conducted to suppress noise using tubes with a pure fused silica of open cell construction, of a density of about 25 pounds per cubic foot, and cells less than ⅛-inch diameter on the average. It was found that this material suppressed the sound very effectively. It is believed that the reason why the open cell porous construction in a ceramic material is highly effective in suppressing sound is that the many cells resist conduction of sound to the outside, and they reduce reflection of sound within the tube 12, particularly the higher frequency components.

In order to further suppress sound reflections within the tube, the sound suppressor illustrated in the figures is provided with recesses 34 at the inner walls. Sound waves entering a recess tend to be reflected between the walls of the recess, to thereby increase sound absorption. In addition, the recesses increase the wall area in contact with the exhaust gas stream, and can create eddy-currents which dissipate energy. The small pores in the ceramic material receive high frequency components of the sound waves and effectively suppress them, while the recesses 34, which are much larger than the pores, can receive lower frequency sound components to help suppress them.

Additional sound suppression is obtained by drilling or otherwise forming a multiplicity of narrow, deep holes 36 substantially radially into the inner walls. The holes 36 extend a substantial distance into the walls, such as one-half the wall thickness. It is believed that these holes dissipate noise caused by combustion of fuel that occurs after leaving the exit nozzle of the jet engine.

As an example of a sound suppressor of the type illustrated in the figures, blocks of porous silica may be used with a thickness T of 3 inches, a width W of 6 inches, and a length of 12 inches, for a sound suppressor with an internal diameter D of about 48 inches. The blocks may be of open cell type pure fused silica foam, with a density of 25 pounds per cubic foot. In such material, the silica occupies less than about 20° of the total volume while the remaining 80° is void (contains air). This provides good sound insulation when walls of at least a few inches thickness are provided. The ceramic foam material preferably has small pores, such as an average diameter of less than one-eighth inch to increase the mechanical strength and the insulation properties, while the recesses 34 preferably measure at least about an inch across to receive lower frequency sound components. The deep narrow holes 36 are of a diameter at least twice as great as the pores, such as five-sixteenths inch, are spaced about 2 inches from each other in a largely random pattern, and have a depth at least several times their diameter, such as about 3 inches. The blocks are preferably held together by a silica mortor material, so that all of the material has about the same temperature coefficient of expansion. While the foam material is currently expensive, the simplicity of construction and operation makes the sound suppressor using such material very economical.

Thus, the invention provides a dry-type sound suppressor of simple construction and long life, which effectively suppresses sound from a jet engine exhaust.

Although particular embodiments of the invention have been described and illustrated herein, it is recognized that modifications and variations may readily occur to those skilled in the art, and consequently, it is intended that the claims be interpreted to cover such modifications and equivalents.

What is claimed is:

1. Apparatus for suppressing the sound from a jet engine exhaust comprising:
   a tube for receiving said exhaust, said tube having inner walls of a highly porous open cell ceramic material, said inner walls including numerous blocks of said ceramic material arranged in a circle to form a substantially circular passageway, some of said blocks extending radially inwardly further into said passageway than others to form grooves extending along the length of said tube, whereby to better absorb sound.
2. A jet engine noise suppressor comprising:
   a tube having a first end for receiving the exhaust from a jet engine and a second end for directing said exhaust into the atmosphere, said tube including an outer casing, and walls within said casing forming a tube portion for carrying gases received from said engine;
   said walls constructed of a porous ceramic material of at least several inches thickness with a majority of its volume occupied by pores that are connected to one another, said material being of open cell construction, with cells of an average diameter of less than one-eighth inch, and said walls having a plurality of depressions of at least an inch in width and extending along the length of said tube, whereby to absorb high and low frequency sound components.
3. A jet engine noise suppressor comprising:
   a tube having a first end for receiving the exhaust from a jet engine and a second end for directing said exhaust into the atmosphere, said tube having inner walls constructed of porous material forming a passageway for said exhaust, said inner walls forming a plurality of grooves extending in a direction axially along the length of said passageway.
4. The jet engine described in claim 3 wherein:
   said passageway is substantially circular, and said grooves extend radially into said walls.

* * * * *